Patented Oct. 18, 1932

1,883,645

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

PRODUCT MADE FROM MICA SPLITTINGS AND PROCESS OF MAKING SAME

No Drawing.   Application filed November 5, 1924. Serial No. 747,994.

This invention relates to products made from mica splittings and rubber latex and relates especially to mica splittings built up into a laminated form to make sheets, plates and various shaped products used for insulating and decorative purposes.

The term mica splittings is well recognized in the trade referring to thin leaves or flakes of mica usually ranging from one inch to two inches in diameter and thus being handled in a quite different manner from mica in the powdered form employed as a filler.

The splittings are coated with the latex or rubber emulsion and after drying are laid or piled one above another, overlapping in such a way as to form large sheets or plates of the desired thickness. This assemblage is then subjected to hot pressing to vulcanize the rubber coating. Ordinary rubber latex may be employed also latex from other sources such as gutta latex. Artificial emulsions or dispersions of rubber in water such as may be obtained by the colloid mill or by Pratt's process of dispersion also may be used. Rubber latex in a somewhat concentrated form as obtained in this country and which contains ammonia or preservative agents is satisfactory for the purpose.

The vulcanization may be carried out by the introduction of ordinary ground sulphur or preferably by the employment of precipitated sulphur. The use of sulphur chloride is not precluded. The flakes of latex-coated mica may be immersed in a dilute solution of sulphur chloride to obtain an initial vulcanization and subsequently hot pressed.

Acceleration of vulcanization may be obtained by using various accelerating substances such as ethylideneaniline, diphenylguanidine, hexamethylenetetramine and the like. Zinc oxide may be employed as an assistant and various fillers may be introduced between the flakes if desired.

Ammonia has the property of keeping the latex in a good state of dispersion. Ammonium polysulphide therefore may be employed with the latex to furnish sulphur for vulcanizing purposes which is thus obtained in a state of remarkably fine distribution. The coloring agents may be added as desired. Also various substances and diluents such as resins etc. to modify the flow or stiffness or secure a cheaper product.

The latex of ordinary rubber is especially recommended because applied to mica in this form it sticks to the surface effectively. This is an important consideration as many binders such for example as the phenol formaldehyde resins do not have the same good quality of sticking to mica.

As an example of a latex solution and manipulation satisfactory for this purpose 15 parts of a 30 per cent ammoniacal latex solution are thoroughly mixed with ½ part of flowers of sulphur. These two materials are thoroughly incorporated either in a ball mill or other mixing device. This mixture is equivalent to a 90-10 latex-sulphur mixture. To this 84½ parts of a 5 per cent ammonia solution are added and then .025 parts (½ per cent) of hexamethylenetetramine and .005 parts (1/10 per cent) of zinc oxide. The complete solution is then thoroughly mixed. These proportions give a 5 per cent latex sulphur content in ammoniacal water solution. The mica splittings are coated with this solution either by spraying, dipping, brushing or other satisfactory method, dried and formed into sheets or plates. This assemblage of coated mica splittings is finally subjected to vulcanization in a hydraulic press for one hour at a temperature of 160° C. under a pressure of 1000 pounds to the square inch.

If it is desired to have more latex or rubber between the splittings, or to obtain a harder and stiffer degree of vulcanization, this can be accomplished by increasing the latex-sulphur content of the coating solution or the sulphur content of this mixture. As for example 26.6 parts of 30 per cent latex are thoroughly mixed with 2 parts of sulphur. This is equivalent to an 80—20 latex-sulphur mixture. To these ingredients 71.4 parts of 5 per cent ammonia solution are added. This finished solution will then contain 10 per cent of the latex-sulphur composition. The accelerator etc. are then added and the manipulation as given in the above example carried out.

Of course it is understood that this invention is not limited to the examples given herein, the degree of hardness of the vulcanized latex binder can be increased or decreased by regulating the amount of sulphur used and the weight of the binder between the splittings can be increased or decreased by regulating the amount of latex-sulphur mixture in the coating solution.

What I claim is:—

1. The process of making laminated mica products which comprises coating mica splittings with a mixture of rubber latex and a vulcanizing agent, assembling a quantity of the splittings and hot pressing to vulcanize the rubber coating and to cause the splittings to adhere to yield a coherent molded article.

2. The process of making laminated mica products which comprises coating mica splittings with a mixture of rubber latex, a vulcanizing agent and an accelerator, assembling a quantity of the splittings and hot pressing to vulcanize the rubber coating and to cause the splittings to adhere to yield a coherent molded article.

3. The process of making laminated mica products which comprises coating mica splittings with a mixture of rubber latex, a vulcanizing agent, sulphur and an accelerator, assembling a quantity of the splittings and hot pressing to vulcanize the rubber coating and to cause the splittings to adhere to yield a coherent molded article.

4. Mica splittings in sheeted laminated form bonded by vulcanized rubber particles.

5. Mica splittings in sheeted laminated form bonded by vulcanized rubber deposited from a dispersion thereof.

6. Mica splittings in sheeted laminated form bonded by vulcanized rubber latex.

7. Latex-coated mica splittings.

8. Vulcanized latex-coated mica splittings.

9. The process of making laminated mica products which comprises coating mica splittings with an aqueous ammoniacal latex solution containing sulphur in admixture, drying the coated splittings, forming the dried splittings into sheets, and hot pressing to vulcanize the coating and to cause the splittings to adhere to yield a coherent molded article.

10. The process of making mica products which comprises coating mica splittings with a colloidal rubber dispersion in water, and hot pressing the coated splittings to cause them to adhere to yield a coherent molded article.

11. The process of making mica products which comprises coating mica splittings with an aqueous ammoniacal latex solution containing a resin in admixture therewith to modify the flow of the material, drying the coated splittings, forming the dried splittings into sheets, and hot pressing to vulcanize the coating and to cause the splittings to adhere to yield a coherent molded article.

12. As a new article of manufacture, a sheet of laminated mica material including a film of rubber latex.

CARLETON ELLIS.